Nov. 28, 1944.    R. M. PARTINGTON    2,363,898
PROTECTIVE SYSTEM
Filed Oct. 26, 1940
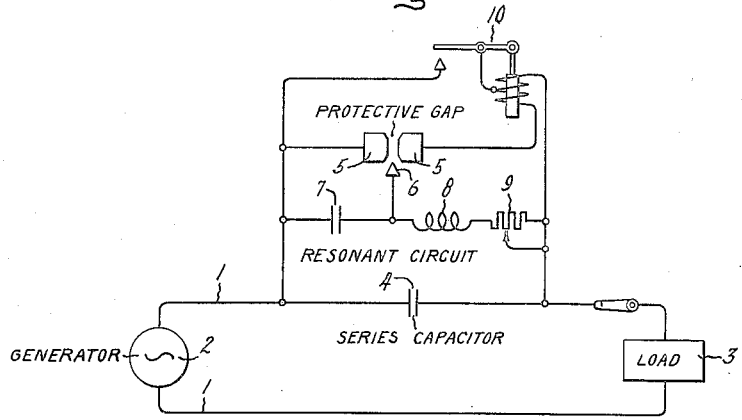
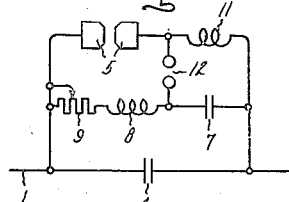
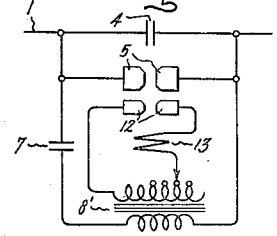
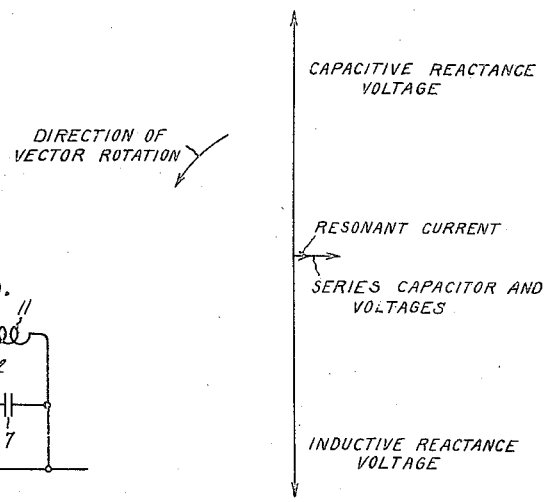
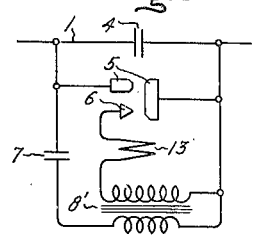
Inventor:
Robert M. Partington,
by Harry E. Dunham
His Attorney.

Patented Nov. 28, 1944

2,363,898

UNITED STATES PATENT OFFICE 2,363,898

PROTECTIVE SYSTEM

Robert M. Partington, New Lebanon, N. Y., assignor to General Electric Company, a corporation of New York Application October 26, 1940, Serial No. 363,013

19 Claims. (Cl. 175—294)

This invention relates to protective systems and more particularly to automatic overvoltage protective systems for electrical circuit elements.

Most electrical circuit elements are provided with a dielectric or insulating medium which is subject to permanent breakdown if the voltage across it exceeds a certain safe value. A common way of protecting such elements is to shunt them by a device that is practically an insulator when the voltage of the circuit element is below the safe value and becomes practically a short circuit when the voltage of the element exceeds the safe value. An arc gap comprising a pair of spaced electrodes in air is an example of a well-known protective device of this description. However, the minimum reliable arc-over or breakdown voltage of such a gap is of the order of 2,000 volts and many circuit elements do not normally operate at such a relatively high voltage and it would be uneconomical to design them so that their dielectric would be capable of withstanding such a voltage.

In accordance with this invention there is provided novel and simple means for causing protective means of the type which inherently operates at a relatively high voltage to operate in a manner to protect from overvoltage a circuit element when the voltage of this circuit element attains its maximum safe voltage when that voltage is substantially less than the inherent operating voltage of the protecting means.

Series capacitors are well-known circuit elements which usually require overvoltage protection. A series capacitor is an electrostatic condenser which is effectively connected in series in an alternating current circuit either by direct connection therein or by means of a series transformer. The usual purpose of such a series capacitor is to neutralize in whole or in part the inductance of its circuit so as to reduce the reactance voltage drop in the circuit and therefore improve the circuit's inherent voltage regulation. Most of these circuits are power circuits which are occasionally subjected to overloads and short circuits and the abnormal currents accompanying these conditions produce relatively high voltages across the capacitor. Capacitors can, of course, be constructed to withstand these high voltages but it is usually less expensive to design and construct them in such a manner that they will only safely withstand voltages to which they are subjected during normal conditions and provide these relatively inexpensive capacitors with overvoltage protective means. In large power circuits, such as transmission lines and main distribution feeders, the capacitors will often have normal operating voltages exceeding 2,000 volts but there are many series capacitor applications to relatively small-size low-power circuits where the normal capacitor voltages will be very much less than 2,000 volts and in many instances will be of the order of 250 volts. Examples of such applications are alternating current welding circuits, high frequency induction furnaces, high frequency generators, and general distribution circuits.

In this invention means is provided for stepping up the capacitor voltage at the same frequency as the capacitor voltage and applying this stepped-up voltage directly at the same frequency, or indirectly and further stepped up at a different frequency, to certain electrodes of a main protective gap which is capable of carrying the full circuit current. In its preferred form this means comprises a tuned series-resonant non-oscillatory circuit. Such a resonant voltage step-up means is particularly well adapted for use with and cooperates in a novel and useful manner with series capacitors which are in the circuit of intermittently operated welders whose duration of operation is accurately timed. This is because it has been found that the accurate timing of the length of a welding operation is correlated to the amount of charge on the series capacitor at the start of the welding operation. The proper charge eliminates an undesirable transient which makes accurate timing possible. The capacitor in the resonant circuit of this invention prevents this charge from leaking off the series capacitor and thus improves the welder operation. Also, the resonant circuit voltage step-up means is well adapted for use with high frequency circuits as its size and cost will be very much less at high frequency than the size of other types of voltage step-up means, such, for example, as step-up transformers.

An object of the invention is to provide new and improved overvoltage protective means for electrical circuit elements.

Another object of the invention is to provide a new and improved arrangement for providing reliable operation of overvoltage protective arc gaps for relatively low voltage series capacitors.

The invention will be better understood from the following description taken in connection with the accompanying drawing and its scope will be pointed out in the appended claims.

In the drawing, Fig. 1 illustrates diagrammatically an embodiment of the invention, Fig. 2 is a vector diagram for explaining the operation of Fig. 1, and Figs. 3, 4, and 5 are modifications.

Referring now to the drawing and more particularly to Fig. 1, there is shown therein a main alternating current circuit 1 which is supplied with current by a generator 2 and to which is connected a load 3. Connected in this circuit is a series capacitor 4 and connected across the capacitor is a protective arc gap comprising a pair of spaced main electrodes 5 and an auxiliary electrode 6 located between the main electrodes. These electrodes may be made of any suitable material, such as carbon for example.

The means for stepping up the capacitor voltage comprises a capacitive reactance or auxiliary capacitor 7 connected between one terminal of the series capacitor 4 and the auxiliary electrode 6 and an inductive reactance or reactor 8 connected between the other terminal of the series capacitor and the auxiliary electrode 6. It will be seen that the capacitive reactance 7 and the inductive reactance 8 are serially connected in an auxiliary circuit to which the voltage of the series capacitor 4 is applied.

For adjusting the amount that the capacitor voltage is stepped up there is provided a rheostat 9 serially connected in the auxiliary circuit.

It is sometimes desirable to short-circuit the protective gap after it arcs over so as to protect its electrodes from injury due to prolonged arcing. For this purpose a normally open contactor 10 is provided. The operating winding for this contactor is in series with the protective gap so that when current flows in the protective gap the contactor 10 closes, thereby short-circuiting the gap and extinguishing the arc. The contacts of the contactor 10 are preferably connected so that they also short-circuit a portion of its operating winding as well as the protective gap so that the contactor contact current will flow through only the remaining turns of the operating winding. In this manner the holding effect of the operating winding is reduced so that the contactor can be made to drop out at a value of current slightly below that which produces the maximum safe voltage across the series capacitor.

The operation of the invention is as follows: Capacitive and inductive reactances are commonly said to have opposite signs because the voltage drops through them produced by the same current are opposite in direction or of opposite sign. Therefore, the voltage across the capacitor 7 subtracts directly from the voltage across the reactor 8 and vice versa and hence at least one of these voltages will ordinarily be greater than the voltage across the series capacitor. Consequently, with any capacitor 7 and any reactor 8 the voltage between the auxiliary electrode 6 and one of the main electrodes 5 will always be greater than the voltage across the series capacitor 4 if we neglect the resistance of the auxiliary circuit. The maximum voltage between the auxiliary electrode 6 and the main electrodes will occur when the ohmic values of the capacitor 7 and reactor 8 are equal. This creates a condition of series resonance and theoretically, that is to say, if the resistance of the auxiliary circuit and its losses are zero, the voltage across the capacitor 7 and reactor 8 would be infinitely great. Actually, however, it is impossible to make reactors and capacitors without losses and without resistance so that this condition can never actually be obtained. However, voltages of one hundred times the voltage across the capacitor 4 may easily be obtained from a series resonant circuit.

Fig. 2 shows the vector relations between the voltages for one condition of resonant operation. The series capacitor voltage produces a resonant current in the auxiliary circuit which is in phase with the series capacitor voltage because the capacitive and inductive reactances 7 and 8 exactly cancel each other so that the auxiliary circuit has no resultant reactance and is the equivalent of a resistance. The series capacitor voltage is therefore equal to and in phase with the resistance voltage drop in the auxiliary circuit which is labeled in the diagram "Rheostat voltage." The inductive reactance voltage across the reactor 8 lags the series capacitor voltage by 90 degrees and the capacitive reactance voltage drop in the capacitor 7 leads the series capacitor voltage by 90 degrees. These two voltages are directly proportional to the current in the auxiliary circuit and this current is directly proportional to the resistance of the rheostat 9. Consequently, these two voltages may readily be adjusted to almost any value desired by changing the resistance of the rheostat.

In practice the rheostat is so adjusted that when the capacitor voltage reaches its maximum safe value the voltages between the auxiliary electrode 6 and the other two electrodes 5 will be such that the auxiliary gaps therebetween will arc over thereby ionizing the main gap and permitting it to arc over directly between the electrodes 5 whereby substantially all of the main circuit current will flow through the gap. The voltages between the auxiliary electrode and the main electrode may therefore be considered to be ionizing potentials for ionizing the main gap. Once the main gap arcs over, the arc will continue as it requires a relatively low voltage to maintain an arc in comparison with the voltage required to strike it. Hence, after the arc-over the resonant circuit need function no longer.

The amount of current required by the auxiliary circuit may be made as small as desired by properly proportioning the elements of this circuit. Thus, for example, but not by way of limitation, if the maximum safe voltage of the series capacitor is 250 volts, which occurs when the current in the main circuit is 100 amperes, a rheostat setting of 1250 ohms will limit the current in the resonant circuit to one-fifth of an ampere which is a negligible value compared with the 100 amperes in the main circuit. If now the ohmic reactance values of the capacitor 7 and reactor 8 are 10,000 ohms the voltages across each of these elements will be 2,000 volts and by suitable settings of the electrodes of the gap these 2,000 volts between the auxiliary electrode 6 and each of the main electrodes 5 can be made the critical voltage at which the gap arcs over.

Unless the spacing of the main carbon electrodes 5 is quite small it has been found that sometimes the striking of an arc between one of these electrodes and the starting electrode 6 will not cause an arc to strike across the main electrodes. In order to overcome this difficulty when it is necessary to have a relatively wide spacing of the main electrodes the arrangement shown in Fig. 3 may be used.

In Fig. 3 a choke coil 11 is connected in series with the main gap and an auxiliary or starting gap 12 has one of its electrodes connected between the gap 5 and the choke 11 and the other of its electrodes connected between the auxiliary capacitor 7 and the reactor 8. The arrangement is such that when the safe voltage of the series capacitor 4 is reached the voltage across the capacitor 7 which is applied across the starting gap 12 through the choke coil 11 will be sufficiently high to cause an arc to strike across the starting gap. This will cause a high frequency oscillation to be set up between the capacitor 7 and the choke coil and the high frequency oscillations will produce a sufficiently high voltage to cause arc-over of the main gap 5.

The choke coil 11 may consist of a few turns of copper rod having an inductance of the order of two or three microhenries. The capacitor 7 may have a capacitance of approximately .05 microfarad and the reactor may have an inductance of approximately 150 henries. A circuit having such constants would be suitable for protecting a series capacitor whose maximum safe operating voltage is 400 volts and the starter gap would have an arc-over value of 4000 or 5000 volts.

The circuit consisting of the auxiliary capacitor 7 and the reactor 8 in both Figs. 1 and 3 is of course a non-oscillatory circuit and the stepping up in voltage which it produces is always at the frequency of the main power circuit, that is, at the applied frequency of the resonant circuit.

Another form of my invention which does not require the use of an auxiliary starting electrode in the main gap is shown in Fig. 4. This circuit makes use of a step-up potential transformer 8' in place of the reactor 8 of the previous figures. The primary winding of the transformer is connected in series with the capacitor 7 so that its voltage is stepped up above the voltage of the series capacitor 4 by means of the series resonant circuit characteristics previously described. This voltage is then further stepped up by the voltage ratio of the transformer, which may be adjusted by means of suitable taps on the secondary winding. The secondary voltage is then applied across an auxiliary gap 12 which is preferably located below the main gap 5 so that the heated arc gases in rising will ionize the main gap. This action may be greatly increased by adding a blow-out coil 13 for forcing the arc between the auxiliary gap electrodes upward into the gap between the main electrodes 5. The ionizing effect of this action results in an arc-over of the main gap.

In the modification shown in Fig. 5 the main gap and the auxiliary gap are combined into a three-electrode gap which is so arranged that when an arc occurs between one of the main electrodes and the auxiliary electrode 6 it will be blown upward by the blow-out coil 13 and thus initiate arc-over of the main gap.

It will be noted that in all of the figures it is impossible for the main series capacitor 4 to discharge through the protective means once the arcs in the various gaps are extinguished, which condition will, of course, occur long before the capacitor 4 would have a chance to discharge normally. Thus, the presence of the capacitor 7 in all of the figures effectively prevents a charge on the capacitor 4 from leaking off through the protective means.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, an alternating current circuit including a series capacitor, an overvoltage protective device connected around said capacitor, and means connected across said capacitor and operative in response to existence of overvoltage across said capacitor for causing operation of said device, said means offering substantially infinite resistance to the flow of direct current whereby any charge existing on said capacitor after said alternating current circuit is opened cannot leak off through said means.

2. In combination, an alternating current circuit including a series capacitor, an overvoltage protective device connected around said capacitor, and means connected across said capacitor and operative in response to existence of overvoltage across said capacitor for causing operation of said device, said means including an auxiliary capacitor in the connection across said series capacitor.

3. In combination, an alternating current circuit including a series capacitor, an overvoltage protective arc gap connected around said capacitor, and means connected across said capacitor and operative in response to existence of overvoltage across said capacitor for causing operation of said gap, said means including an inductive device and an auxiliary capacitor serially connected with each other across said series capacitor.

4. In combination, an electric circuit, a circuit element connected thereto, said circuit element having a dielectric which is subject to permanent breakdown by overvoltages accompanying abnormal conditions in said circuit, overvoltage protective means for said element, said means being inherently operative in response to a voltage substantially in excess of the maximum safe voltage of the dielectric of said element, and means for causing operation of said protective means when the voltage of said element attains its maximum safe value comprising a pair of opposite sign reactances of predetermined ohmic values serially connected in an auxiliary circuit, said auxiliary circuit being energized by an alternating voltage proportional in magnitude to the voltage of said element, the voltage of at least one of said reactances being applied to said protective means.

5. In combination, an alternating current circuit, a relatively low voltage circuit element effectively connected in series with said circuit, an overvoltage protective arc gap effectively connected across said element, said arc gap comprising a plurality of spaced electrodes in air between which a relatively high voltage must be applied to cause an arc-over, said gap being capable of carrying the full current of said circuit, and means for stepping up the voltage across said element at the same frequency and applying said stepped-up voltage continuously between certain electrodes of said gap, said voltages being directly proportional to each other and of such ratio that at a voltage across said circuit element which closely approaches a safe value said gap will arc over.

6. In combination, an alternating current circuit, a circuit element effectively connected therein, an arc gap effectively connected across said circuit element, said arc gap being adapted to protect said circuit element from overvoltages by carrying the full circuit current when said current is above a predetermined value, and means responsive to the voltage of said circuit element for applying a variable alternating ionizing potential to said gap which is proportional to but many times greater than the voltage across said circuit element, said ionizing potential being of the same frequency as the frequency of said circuit.

7. In combination, an alternating current circuit, a series capacitor effectively connected therein, an arc gap effectively connected across said capacitor, said arc gap being adapted to protect said series capacitor from overvoltages by carrying the full circuit current when said current is above a predetermined value, means responsive to the voltage of said capacitor for applying a variable alternating ionizing potential to said gap which is proportional to but many times greater than the voltage across said capacitor, said ionizing potential being of the same frequency as the frequency of said circuit, and means for adjusting the ratio of the capacitor voltage to the ionizing voltage.

8. In combination, an alternating current circuit, a relatively low voltage capacitor effectively connected in series with said circuit, an overvoltage protective arc gap effectively connected across said capacitor, said arc gap comprising a plurality of spaced electrodes in air between which a relatively high voltage must be applied to cause an arc-over, said gap being capable of carrying the full current of said circuit, means for stepping up the voltage across said capacitor at the same frequency and applying said stepped-up voltage continuously between certain electrodes of said gap, said voltages being directly proportional and of such ratio that at capacitor voltages above a safe value said gap will arc over, and means for adjusting said ratio.

9. In combination, an alternating current circuit subject to overcurrents, a series capacitor therein whose dielectric will not safely withstand the voltage thereacross accompanying said overcurrents, a protective arc gap connected across said capacitor, said arc gap having an arc-over voltage which is higher than the highest safe voltage of the dielectric of said capacitor, and means comprising a resonant circuit tuned to the frequency of said alternating current circuit for causing said gap to arc over when the voltage of the capacitor dielectric exceeds its safe value.

10. In combination, an alternating current circuit subject to overcurrents, a circuit element therein whose dielectric will not safely withstand the voltage thereacross accompanying said overcurrents, a protective arc gap connected across said circuit element, said arc gap having an arc-over voltage which is higher than the highest safe voltage of the dielectric of said circuit element, and means comprising a resonant circuit tuned to the frequency of said alternating current circuit for causing said gap to arc over when the voltage of the circuit element dielectric exceeds its safe value.

11. In combination, an alternating current circuit subject to overcurrents, a series capacitor therein whose dielectric will not safely withstand the voltage thereacross accompanying said overcurrents, a protective arc gap connected across said capacitor, said arc gap having an arc-over voltage which is higher than the highest safe voltage of the dielectric of said capacitor, and means including a linear series-resonant non-oscillatory circuit for causing said gap to arc over when the voltage of the capacitor dielectric exceeds its safe value.

12. In combination, an alternating current circuit including a series capacitor, an overvoltage protective arc gap having a pair of main electrodes connected respectively to the terminals of said capacitor and having an auxiliary electrode located between said main electrodes, a capacitive reactance connected between one terminal of said capacitor and said auxiliary electrode, and an inductive reactance of the same ohmic value as said capacitive reactance at the fundamental frequency of said circuit connected between the other terminal of said capacitor and said auxiliary electrode.

13. In combination, an alternating current circuit including a series capacitor, an overvoltage protective arc gap having a pair of main electrodes connected respectively to the terminals of said capacitor and having an auxiliary electrode located between said main electrodes, a capacitive reactance connected between one terminal of said capacitor and said auxiliary electrode, and an inductive reactance connected between the other terminal of said capacitor and said auxiliary electrode.

14. In combination, an alternating current circuit including a series capacitor, an overvoltage protective arc gap having a pair of main electrodes connected respectively to the terminals of said capacitor and having an auxiliary electrode located between said main electrodes, a capacitive reactance connected between one terminal of said capacitor and said auxiliary electrode, an inductive reactance of the same ohmic value as said capacitive reactance at the fundamental frequency of said circuit connected between the other terminal of said capacitor and said auxiliary electrode and a rheostat connected in series with one of said reactances.

15. In combination, an alternating current circuit including a series capacitor, an overvoltage protective arc gap having a pair of main electrodes connected respectively to the terminals of said capacitor and having an auxiliary electrode located between said main electrodes, a capacitive reactance connected between one terminal of said capacitor and said auxiliary electrode, an inductive reactance of the same ohmic value as said capacitive reactance at the fundamental frequency of said circuit connected between the other terminal of said capacitor and said auxiliary electrode, and means responsive to current flow between main electrodes for short circuiting said capacitor and arc gap.

16. Overvoltage responsive means for protecting series capacitors comprising, in combination, a non-oscillatory capacitor-reactor circuit for stepping up the voltage of a series capacitor at the frequency of said series capacitor, an oscillatory capacitor-reactor circuit for stepping up the voltage of said non-oscillatory circuit, and by-passing means for said series capacitor operative in response to the voltage produced by said oscillatory circuit.

17. An alternating current circuit, a series capacitor connected therein, an arc gap connected across said capacitor, a step-up potential transformer having a primary winding and a secondary winding, an auxiliary capacitor connected in series with said primary winding across said series capacitor, and means responsive to the secondary voltage of said transformer for controlling the conductivity of said first-mentioned gap.

18. An alternating current circuit, a series capacitor connected therein, an arc gap connected across said capacitor, a step-up potential transformer having a primary winding and a secondary winding, an auxiliary capacitor connected in series with said primary winding across said series capacitor, and means including an auxiliary arc gap responsive to the secondary voltage of said transformer for controlling the conductivity of said first-mentioned gap.

19. An alternating current circuit, a series capacitor connected therein, an arc gap connected across said capacitor, a step-up potential transformer having a primary winding and a secondary winding, an auxiliary capacitor connected in series with said primary winding across said series capacitor, means including an auxiliary arc gap responsive to the secondary voltage of said transformer for controlling the conductivity of said first-mentioned gap, and a blow-out coil for forcing an arc across said auxiliary gap into the first-mentioned gap.

ROBERT M. PARTINGTON.